United States Patent [19]

Miller

[11] Patent Number: 5,222,574
[45] Date of Patent: Jun. 29, 1993

[54] DRIVE TRAIN FOR AN ARTICULATED VEHICLE

[75] Inventor: Larry G. Miller, German Valley, Ill.

[73] Assignee: Rockford Powertrain, Inc., Rockford, Ill.

[21] Appl. No.: 903,448

[22] Filed: Jun. 24, 1992

[51] Int. Cl.[5] .............................................. B60K 17/24
[52] U.S. Cl. .................................. 180/379; 180/235; 180/14.4; 180/384
[58] Field of Search ...................... 180/14.4, 349, 379, 180/376, 384, 383, 235, 53.1; 280/404

[56] References Cited

U.S. PATENT DOCUMENTS

| | | | |
|---|---|---|---|
| 3,191,709 | 6/1965 | Symons | 180/235 |
| 3,908,398 | 9/1975 | Braunberger | 180/14.4 |
| 4,042,053 | 8/1977 | Sieren et al. | 180/235 |

FOREIGN PATENT DOCUMENTS 55-22519  2/1980  Japan .................................. 180/235

*Primary Examiner*—Karin L. Tyson
*Attorney, Agent, or Firm*—Leydig, Voit & Mayer

[57] ABSTRACT

A vehicle includes front and rear sections which are pivotally connected to enable the rear section to articulate relative to the front section. A drive train connects a transmission on the front vehicle section to a differential on the rear vehicle section and transmits power between the transmission and the differential while allowing the rear section to articulate relative to the front section. The drive train includes a shaft of fixed length extending from the transmission to a universal joint and includes a shaft of variable length extending from the universal joint to the differential.

2 Claims, 4 Drawing Sheets

DRIVE TRAIN FOR AN ARTICULATED VEHICLE

BACKGROUND OF THE INVENTION

This invention relates to a drive train for an articulated vehicle of the type having a first vehicle section with a rotatable driving unit (e.g., a transmission) and a second vehicle section with a rotatable driven unit (e.g., a differential). The second vehicle section is connected to pivot relative to the first section about an upright axis which is located generally between the driving and driven units when the two vehicle sections are in line with one another.

The driving and driven units are connected by a drive train which transmits power from the driving unit to the driven unit while allowing the second vehicle section to pivot or articulate relative to the first vehicle section. A typical drive train includes a first shaft having one end connected to the transmission or other driving unit of the first vehicle section by a universal joint. A second shaft is supported by a fixed bearing on the second vehicle section and usually is connected to the differential or other driven unit of the second vehicle section by another universal joint. Yet another universal joint serves to connect adjacent ends of the two shafts.

Conventional drive trains of the type described above are relatively complex and expensive. In a conventional drive train, each of the two shafts is formed at least in part by two telescoped splined components (e.g., a splined male or shaft component and a splined female or sleeve component). The splines transmit rotation between the shaft and sleeve components and allow such components to slide axially relative to one another. While the splined components of the second shaft remain axially fixed after installation and during articulation of the second vehicle section, the splined components of the first shaft slide axially relative to one another to accommodate the articulation. Such relative sliding enables the first shaft to change in effective length such that, at any articulation angle, the universal joint angle at one end of the shaft is equal and opposite to that at the other end of the shaft. This insures that there are no speed fluctuations in the transmitted power regardless of the degree of articulation of the second vehicle section.

SUMMARY OF THE INVENTION

The general aim of the present invention is to provide a new and improved drive train of the foregoing general type which is functionally adequate in most applications while being significantly simpler and less expensive than prior drive trains.

A more detailed object of the invention is to achieve the foregoing by providing a drive train which includes only a single shaft with splined components and which eliminates the need and expense of a second shaft with splined components.

A related object is to provide a drive train in which a plain shaft of fixed length is located between universal joints on either side of the articulation point. Only the second shaft includes splined components, one of which is rotatably and non-slidably supported by the fixed bearing on the second vehicle section. The other splined component of the second shaft is connected to the first shaft by a universal joint and slides back and forth relative to its mating splined component to accommodate articulation of the second vehicle section while transmitting torque from the driving unit to the driven unit.

These and other objects and advantages of the invention will become more apparent from the following detailed description when taken in conjunction with the accompanying drawings.

DETAILED DESCRIPTION OF THE PREFERRED EMBODIMENT

Figure 1:
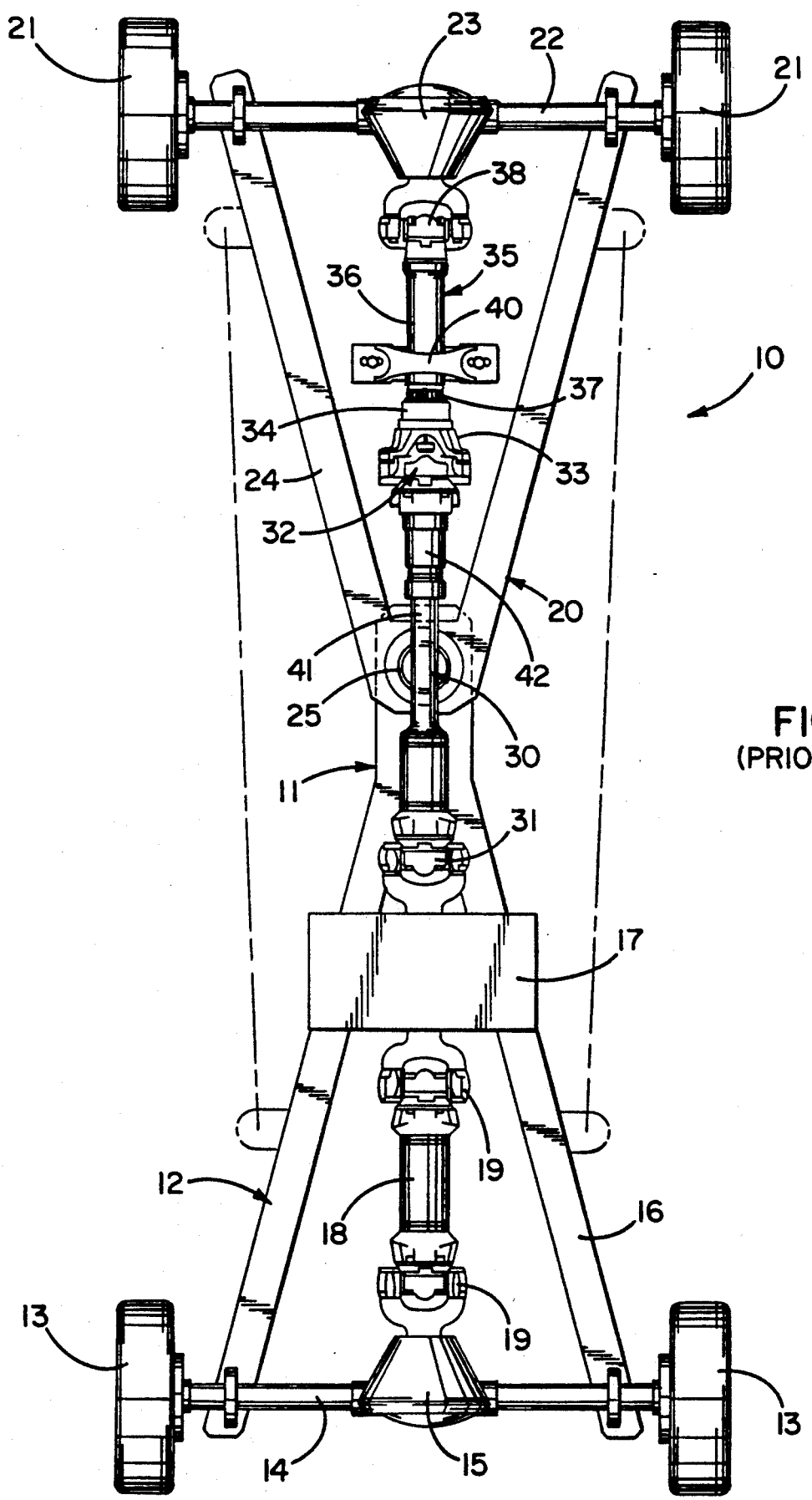
FIG. 1 is a top plan view of a typical articulated vehicle with a conventional prior art drive train, the second section of the vehicle being shown directly in line with the first section thereof.
Figures 2, 3:
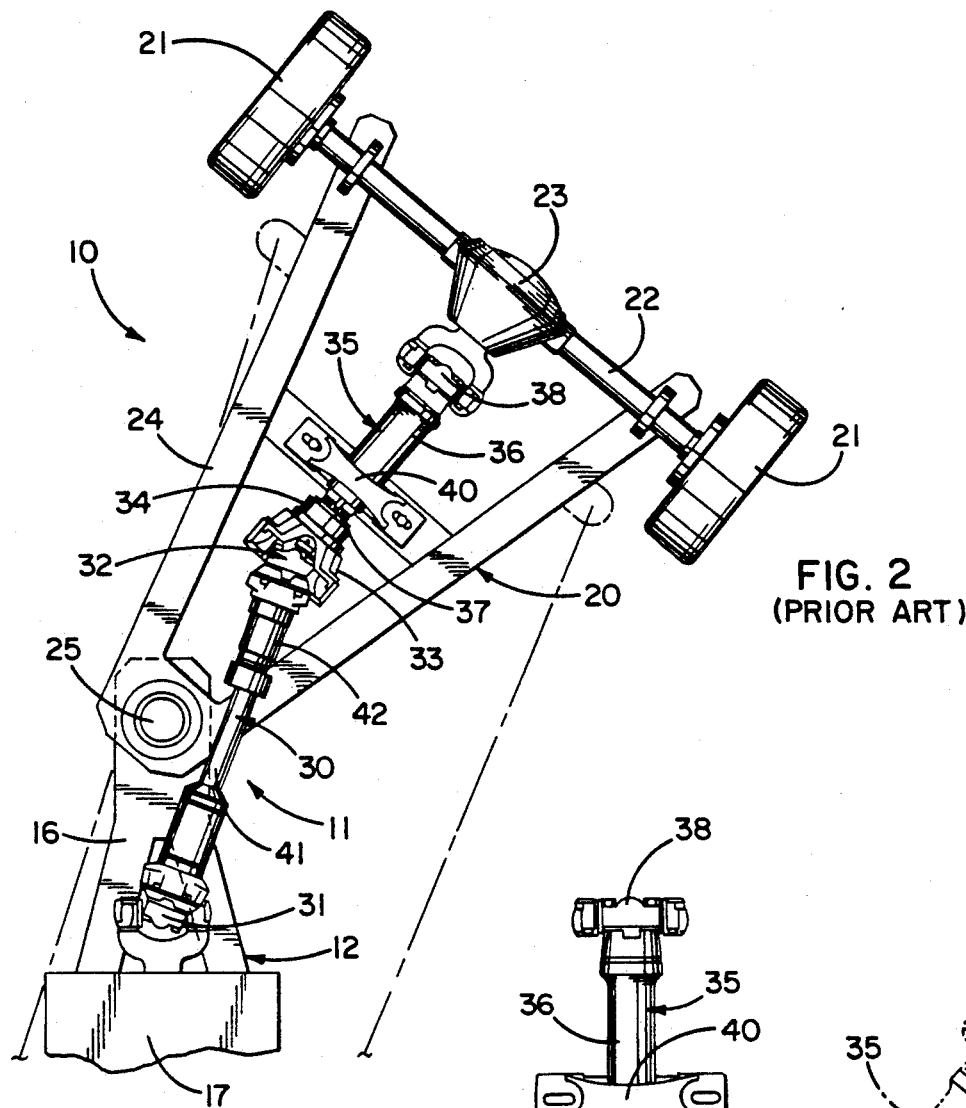
FIG. 2 is a fragmentary view similar to FIG. 1 but shows the prior art drive train when the second vehicle section is articulated at an angle relative to the first vehicle section.
FIG. 3 is an enlarged view of the prior art drive train shown in FIGS. 1 and 2.

An understanding of the present invention will be facilitated by first referring to an articulated vehicle 10 with a conventional prior art drive train 11 as shown in FIGS. 1-3. The particular vehicle which has been illustrated is an all-wheel drive articulated vehicle of the type having a relatively small turning radius for greater maneuverability. Such an articulated vehicle also eliminates the need and cost of a drive/steer axle.

More specifically, the vehicle includes a first or front section 12 with a pair of laterally spaced ground-engaging wheels 13 located at the ends of a front axle 14 and adapted to be driven by way of a differential 15, the axle and differential being supported on a frame 16. A driving unit 17 such as a transmission also is supported on the frame of the front vehicle section 12 and is connected to the differential 15 by means of a drive shaft 18 whose ends are connected to universal joints 19 at the transmission and the differential.

The vehicle 10 also includes a second or rear vehicle section 20 having a pair of laterally spaced ground-engaging wheels 21 located at the ends of an axle 22 and adapted to be driven via a differential 23. The axle and differential are supported on a frame 24 whose forward end portion is connected to the rear end portion of the front vehicle section 12 by a vertical pivot 25. In this way, the rear vehicle section may articulate relative to the front section between, for example, the positions shown in FIGS. 1 and 2.

The drive train 11 transmits power from the transmission 17 to the differential 23 of the rear vehicle section 20 while allowing the rear section to articulate with respect to the front section 12 about the pivot 25. In the prior art drive train shown in FIGS. 1-3, a first drive shaft 30 of variable length is coupled at its forward end to a universal joint 31 at the rear of the transmission 17, extends rearwardly across the articulated joint 25 between the two vehicle sections, and is coupled at its rear end to a universal joint 32 which is formed in part by a yoke 33 having a female member or sleeve 34 at its rear end. The sleeve 34 is internally splined and forms one component of a composite shaft 35 whose other component is formed by a male shaft member 36 having a forward end portion which is telescoped into the sleeve member 34 and which is externally splined as indicated at 37 in FIG. 3 so as to couple the sleeve member and the shaft member for rotation in unison. The rear end portion of the shaft member 36 is connected to the rear differential 23 by a universal joint 38. A so-called center bearing 40 is supported in a rigidly fixed position on the frame 24 of the rear vehicle section 20 and supports the shaft member 36 for rotation while preventing axial movement of the shaft member.

Like the rear shaft 35, the front shaft 30 is formed by two components, namely, a male or shaft member 41 and a female or sleeve member 42. The forward end portion of the shaft member 41 is connected to the universal joint 31 while the rear end portion of such shaft member is externally splined as indicated at 43 in FIG. 3 and is telescoped into the sleeve member 42. The latter is internally splined and its rear end portion is connected to the universal joint 32.

By virtue of the splined shaft member 41 and sleeve member 42, the shaft member may slide axially within the sleeve member and change the effective length of the shaft 30 when the rear vehicle section 20 pivots relative to the front section 12. Thus, as the rear vehicle section pivots from the straight-line position shown in FIG. 1 to the articulated position shown in FIG. 2, the sleeve member 42 telescopes further forwardly onto the shaft member 41 and shortens the effective length of the shaft 30, this being more clearly apparent from the enlarged view of FIG. 3 which shows the straight-line position in solid lines and the articulated position in phantom lines. As a result of such telescoping, the shaft 30 is capable of accommodating articulation of the rear vehicle section 20 while transmitting power from the transmission 17 to the shaft 35. During articulation of the rear vehicle section, the splined sleeve member 34 and the splined shaft member 36 of the shaft 35 remain axially fixed and do not slide relative to one another. The splined joint, however, between the sleeve member 34 and the shaft member 36 is necessary for axial adjustment purposes during installation of the drive train 11 in order to establish a shaft 35 of proper length between the universal joints 32 and 38.

Figure 4:
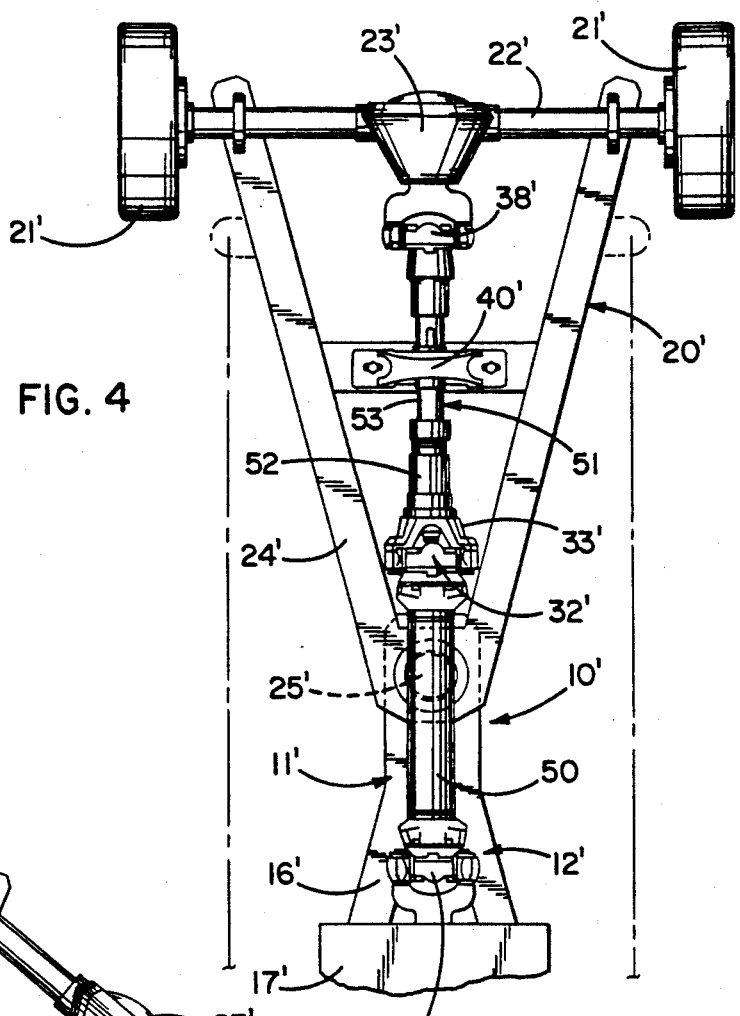
FIG. 4 also is a fragmentary view similar to FIG. 1 but shows the vehicle equipped with a new and improved drive train incorporating the unique features of the present invention, the two sections of the vehicle being shown in line with one another.
Figure 5:
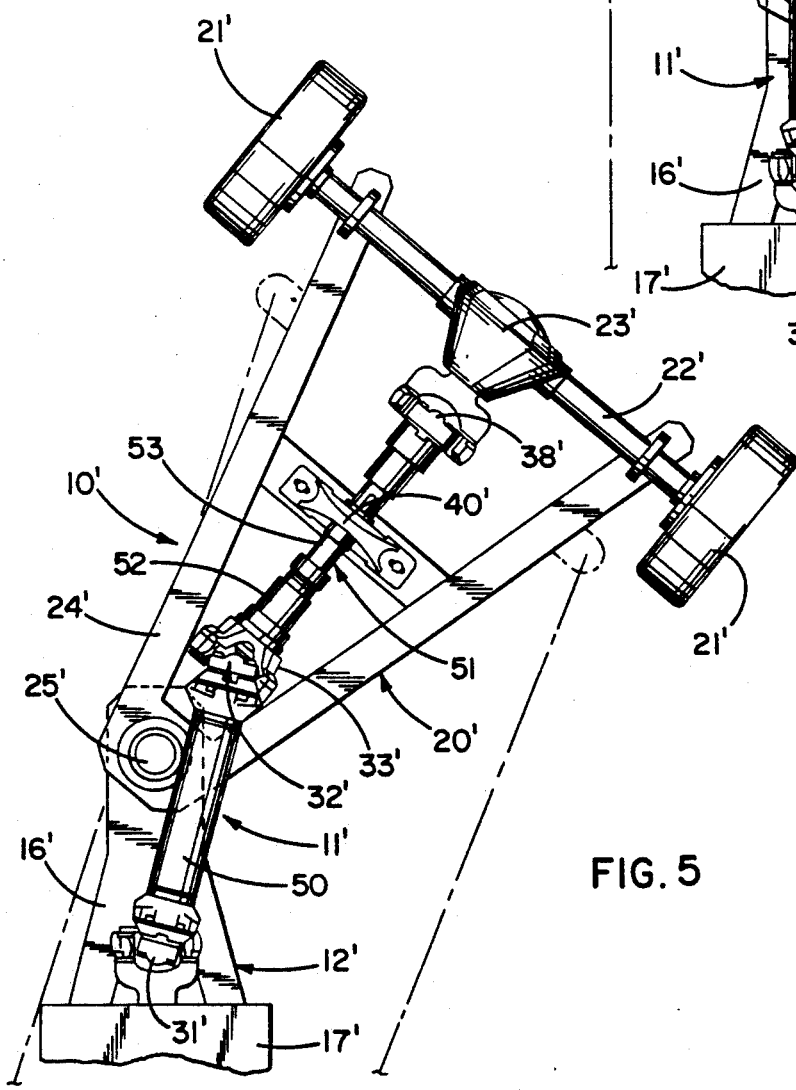
FIG. 5 is a view similar to FIG. 4 but shows the drive train of the invention when the second vehicle section is articulated at an angle relative to the first vehicle section.
Figure 6:
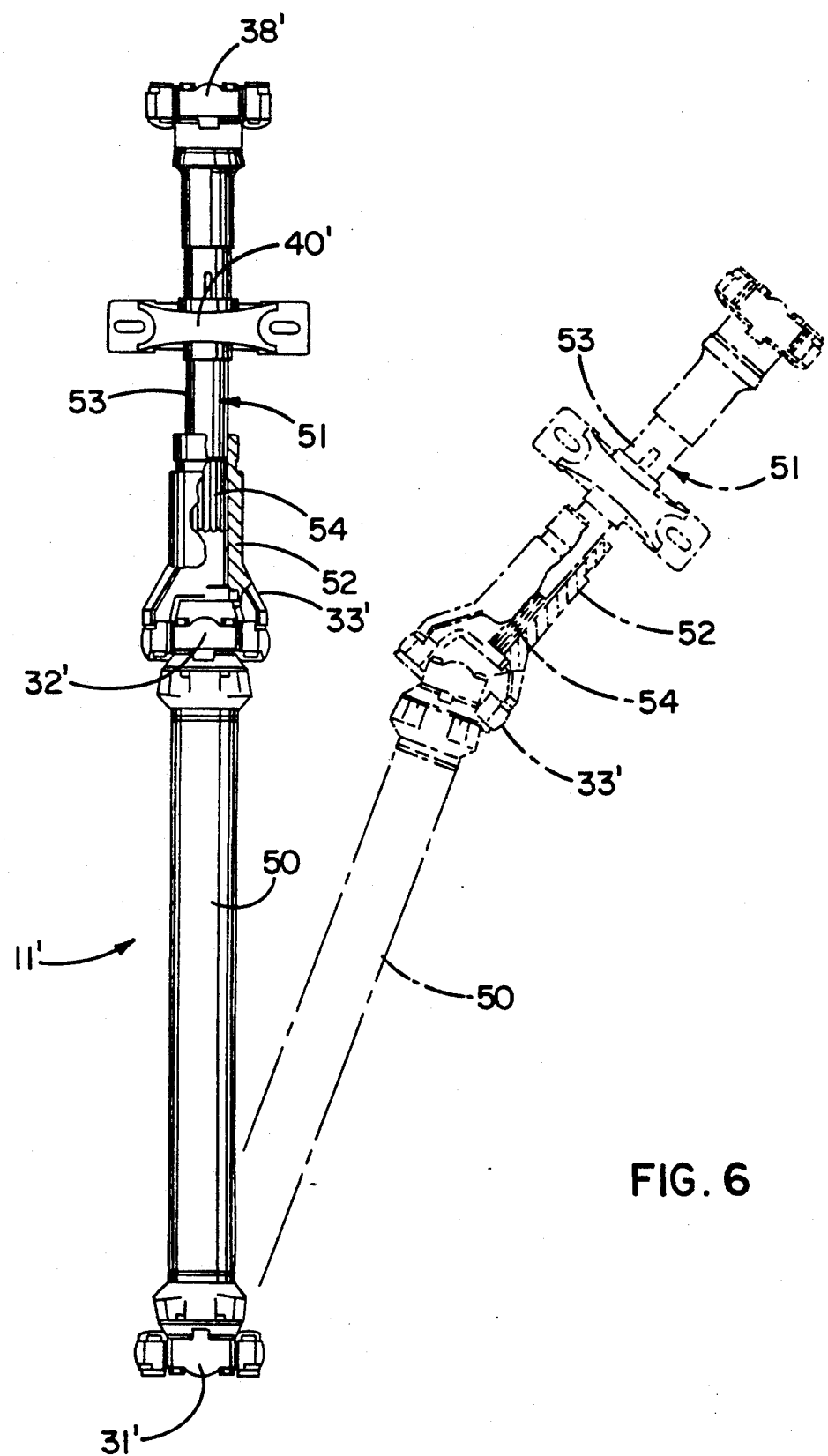
FIG. 6 is a greatly enlarged view of the drive train shown in FIGS. 4 and 5.

According to the present invention, provision is made of a simplified and less expensive drive train 11' which eliminates the need and the cost of one of the splined connections in the drive train. The drive train 11' of the invention is shown in FIGS. 4-6 in which parts corresponding to those of the prior art drive train 11 of FIGS. 1-3 have been indicated by the same but primed reference numerals.

In carrying out the invention, the shaft 30 with the splined shaft member 41 and splined sleeve member 42 of the prior art drive train 11 is replaced by a plain shaft 50 of fixed length. The forward end portion of the shaft 50 is connected to the rear end of the transmission 17' by a universal joint 31', the same as before. The rear end portion of the shaft 50 is connected to a universal joint 32'. Because the shaft 50 is of fixed length, the distance between the universal joints 31' and 32' does not change during articulation of the rear vehicle section 20'.

Further in carrying out the invention, articulation of the rear vehicle section 20' is accommodated by a variable length rear shaft 51 having an internally splined female or sleeve member 52 which slides back and forth relative to a male or shaft member 53 having an externally splined forward end portion 54. Herein, the rear end portion of the shaft member 53 is connected to the rear universal joint 38' as before and, in addition, the shaft member 53 is supported to rotate by a rigidly fixed center bearing 40' which holds the shaft member 53 against axial sliding relative to the rear vehicle section 20'. The forward splined portion 54 of the shaft member 53 is significantly longer than the splined portion 37 of the shaft member 36 of the shaft 35.

The internally splined sleeve member 52 of the shaft 51 is formed as part of the yoke 33' of the universal joint 32' and is considerably longer than the sleeve 34 of the shaft 35 so as to accommodate the long splined portion 54 of the shaft member 53. As the rear vehicle section 20' pivots from the straight-line position shown in FIG. 4 to the articulated position shown in FIG. 5, the sleeve member 52 telescopes deeper onto the shaft member 53 as is apparent from a comparison of the solid line and phantom line illustrations of FIG. 6. Such telescoping accommodates articulation of the rear vehicle section 20' while maintaining a drive from the universal joint 32' to the universal joint 38'. The splined components 52 and 53 not only accommodate the articulation but also enable a shaft 51 of proper length to be established automatically between the universal joints 32' and 38' and thus serve the function of the splined sleeve member 34 and the splined shaft member 36 of the shaft 35.

As a result, the drive train 11' of the invention requires only one set of splined components, namely, the sleeve member 52 and the shaft member 53. As a result of eliminating the other set of splined components, the drive train 11' may be manufactured at a substantially lower cost.

It should be noted that the conventional drive train 11 of the prior art is a perfectly cancelled system in that the angle at the universal joint 32 is always equal to (but opposite from) the angle at the universal joint 31 regardless of the articulated position of the rear vehicle section 20. As a result, there is no fluctuation in the speed of the power transmitted by the shaft 30 across the articulation joint 25. This is apparent from the following table which expresses angles in terms of degrees and torsional excitation in terms of radians/sec.$^2$:

| Articulation Angle | Angle at Joint 32 | Angle at Joint 31 | Torsional Excitation |
|---|---|---|---|
| 0 | 0 | 0 | 0 |
| 5 | 2.50 | 2.50 | 0 |
| 10 | 5.00 | 5.00 | 0 |
| 15 | 7.50 | 7.50 | 0 |
| 20 | 10.00 | 10.00 | 0 |
| 25 | 12.50 | 12.50 | 0 |
| 30 | 15.00 | 15.00 | 0 |
| 35 | 17.50 | 17.50 | 0 |
| 40 | 20.00 | 20.00 | 0 |

In contrast, the simplified drive train 11' of the invention does not constitute a perfectly cancelled system. For each particular application, a rigorous analysis should be made to determine a proper length for the shaft 50. The length selected should provide ideal joint angle cancellation at a zero degree articulation angle (i.e., a straight-line condition) and at a second predetermined articulation angle which usually is selected to be in the range where higher operating speeds normally exist. The following table which is based upon a shaft 50 rotating at 1,000 RPM, shows the variances in joint angles and torsional excitation for a drive train 11' which is designed to provide ideal joint angle cancellation at a zero degree articulation angle and again at a 20 degree articulation angle:

| Articulation Angle | Angle at Joint 32' | Angle at Joint 31' | Torsional Excitation |
| --- | --- | --- | --- |
| 0 | 0 | 0 | 0 |
| 5 | 2.54 | 2.46 | 1 |
| 10 | 5.03 | 4.96 | 2 |
| 15 | 7.55 | 7.45 | 5 |
| 20 | 10.00 | 10.00 | 0 |
| 25 | 12.39 | 12.61 | 18 |
| 30 | 14.71 | 15.29 | 58 |
| 35 | 16.93 | 18.07 | 133 |
| 40 | 19.05 | 20.95 | 254 |

It should be especially noted that the torsional excitation is minimal at lower articulation angles where higher shaft speeds normally occur. At higher articulation angles where the torsional excitation values are larger the shaft speed usually is lower due to the fact that the vehicle 10' normally proceeds slower through a sharp turn. Thus, even though the present drive train 11' does not constitute a perfectly cancelled system, it is fully capable of functioning acceptably in many applications.

A further economic advantage of the improved drive train 11' is the ability to easily tailor the spline configurations of the sleeve member 52 and the shaft member 53 such that the resistance to slip or the torque/slip ratio may be optimized for a particular application. The splines may be either parallel sided, angular sided or of an involute form and may have missing teeth to aid in lubrication and/or alignment. When the rear vehicle section 20' articulates, the spline engagement area automatically increases due to the fact that the sleeve member 52 moves rearwardly and telescopes further onto the shaft 53. This offsets the increased requirement of the splines to absorb the universal joint loads and offset loads that are created as the rear vehicle section articulates.

I claim:

1. A drive train for an articulated vehicle having a first section with a rotatable driving unit and having a second section with a rotatable driven unit, said second vehicle section being connected to pivot relative to said first vehicle section about an upright axis located substantially between said driving and driven units when the two vehicle sections are in line with one another, a first drive shaft having first and second ends with first and second universal joints, respectively, said first universal joint connecting said first shaft to said driving unit, a second drive shaft having a first end connected to said driven unit and having a second end connected to said second universal joint, said first drive shaft being of fixed length between said universal joints regardless of the articulated position of said second vehicle section relative to said first vehicle section, said second drive shaft being of variable length and comprising male and female members having splined telescoped sections connecting said members for rotation in unison while permitting relative axial sliding of said members during articulation of said second vehicle section relative to said first vehicle section, and bearing means fixed non-slidably to said second vehicle section and supporting one of said male and female members for rotation while preventing axial movement of said one member relative to said second vehicle section.

2. A drive train as defined in claim 1 in which said bearing means support said male member of said second shaft.

* * * * *